(12) United States Patent
Walter

(10) Patent No.: US 6,190,274 B1
(45) Date of Patent: Feb. 20, 2001

(54) TRANSMISSION

(75) Inventor: Bernhard Walter, Oberkirch (DE)

(73) Assignee: LuK Getriebe-Systeme GmbH, Buhl/Baden (DE)

(*) Notice: Under 35 U.S.C. 154(b), the term of this patent shall be extended for 0 days.

(21) Appl. No.: 09/314,472

(22) Filed: May 18, 1999

(30) Foreign Application Priority Data

May 18, 1998 (DE) .............................. 198 22 268

(51) Int. Cl.$^7$ .................................. F16H 59/00
(52) U.S. Cl. ............................ 474/28; 474/29
(58) Field of Search ................ 474/28, 12, 29, 474/30

(56) References Cited

U.S. PATENT DOCUMENTS 5,803,846 * 9/1998 Yamada et al. ................. 474/18
5,879,253 * 3/1999 Friedmann et al. ............... 474/18

* cited by examiner

Primary Examiner—David Fenstermacher
(74) Attorney, Agent, or Firm—Darby & Darby

(57) ABSTRACT

In a pair of conical disks (pulley halves) of an infinitely variable cone-pulley transmission, in the case where the conical disks are spaced apart, a pressure compartment through channels formed in a shaft A connects to a pressure chamber that serves to move one of the conical disks. The pressure compartment is on one side delimited by a piston-like part serving to modulate the pressure inside the compartment dependent on the torque acting on the pair of conical disks. By switching on the connection to the pressure compartment, the system pressure can be modulated not only dependent on the torque but also dependent on the transmission ratio. Advantageous designs of the valve arrangement for switching the pressure compartment on and off are described.

9 Claims, 8 Drawing Sheets

TRANSMISSION

BACKGROUND OF THE INVENTION

The invention relates to a pair of conical disks (pulley halves) of a continuously variable cone-pulley transmission with pressure compartments that can be turned on and off.

Continuously variable cone-pulley transmissions are of high interest for use in motor vehicles, particularly passenger cars because, in addition to increased comfort (absence of gear-shift jolts) in comparison to automatic transmissions using hydrodynamic converters, they offer potential advantages in fuel consumption.

A pair of conical disks falling within the same category as the present invention is known from DE 195 44 644. The continuously variable cone-pulley transmission according to this publication has a pair of disks arranged on, and constrained to share the rotation of, the driving shaft and a pair of disks arranged on, and constrained to impart their rotation to, the driven shaft. The disk pairs each have an axially movable conical disk and an axially fixed conical disk. Between the two disk pairs, an endless-loop means in the form of a chain is provided for transmitting a torque. Transmissions of this kind may be subject to leakage losses, which can be harmful to their proper functioning.

OBJECT OF THE INVENTION

The object of the present invention is to further develop a conical disk pair of this kind so that it can be manufactured cost-effectively and works with a reduced amount of leakage losses.

SUMMARY OF THE INVENTION

The invention is embodied in a pair of conical disks (pulley halves) of a continuously variable cone-pulley transmission with means for switching a pressure compartment on and off dependent on the transmission ratio. The disk pair includes

- a shaft to which a movable conical disk is attached in a manner that prevents rotational but permits axial relative movement and to which a fixed conical disk is solidly attached,
- a pressure chamber formed between the movable conical disk and a ring-shaped component that is solidly attached to the shaft,
- a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and
- a second pressure compartment formed, likewise, between the ring-shaped component and the piston-like part.

The first pressure compartment is connected to a pump and has an outlet channel that is closed off by the piston-like part to an increasing degree when there is an increase in the torque. The movable conical disk has centering guide portions sliding in tight contact along the surface of the shaft and interacting with channel openings in the circumference of the shaft to form a valve arrangement. When the distance between the conical disks is large, the valve arrangement, through channels formed in the shaft, connects the second pressure compartment to a space outside of the shaft. When, on the other hand, the distance between the conical disks is small, the valve arrangement connects the second pressure compartment with the pressure chamber instead of the space outside of the shaft.

In accordance with one presently preferred embodiment of the improved transmission, the shaft is provided with an oblique bore hole running through the shaft at an oblique angle, starting from a place that is located on the circumference of the shaft and connected with the second pressure compartment. As a further characteristic of the preferred embodiment, the shaft is also provided with a tap hole leading into the oblique bore hole. In the case where the distance between the conical disks is large, the oblique bore hole leads to the space outside of the shaft and the tap hole is closed off. In the opposite case, when the distance between the conical disks is small, the oblique bore hole is blocked and the tap hole is connected to the pressure chamber.

It is advantageous if the aforementioned tap hole runs in a radial direction relative to the shaft.

In a further advantageous development of the invention, in place of one oblique bore hole and one tap hole, the shaft has two oblique bore holes that run all the way or at least almost all the way through the shaft and are connected with each other. At least one of them opens at both ends to the circumference of the shaft. In the case where the distance between the conical disks is large, the oblique bore holes connect the second pressure compartment to the space outside of the shaft, and a further opening of the oblique bore holes falls in between the centering guide portions of the movable conical disk. When, on the other hand, the distance between the conical disks is small, the movable conical disk closes off the bore hole opening to the space outside of the shaft and opens up the further bore hole opening, thereby establishing a connection to the pressure chamber.

In an advantageous variation of the immediately preceding arrangement, the two oblique bore holes run into each other inside the shaft. One of the oblique bore holes starts from a place that is located on the circumference of the shaft and connected with the second pressure compartment. The other oblique bore hole also opens at one end to the circumference of the shaft where, when the distance between the conical disks is large, it connects to the space outside of the shaft via an axial channel formed between the movable conical disk and the shaft and an axial groove formed in the shaft. In the opposite case, where the distance between the conical disks is small, the end of said other oblique bore hole opens into the pressure chamber, and the axial groove is closed off by the movable conical disk.

In another advantageous development of the invention, at the place where the channel from the second pressure compartment opens to the space outside of the shaft when the distance between the conical disks is large, an axial groove extends to the movable conical disk and an axial channel is formed between the movable disk and the shaft at an axial distance from the axial groove. In the case where the distance between the conical disks is small, the opening of the channel is closed off by the movable conical disk and the axial groove is connected to the pressure chamber via the axial channel and a further axial groove on the surface of the shaft.

In a further advantageous solution to the inventive problem, the channel formed in the shaft that connects the second pressure compartment to the space outside of the shaft when the distance between the conical disks is large ends in two axially offset bore holes that have openings to the outside, and a connector bore hole leads from the pressure chamber across the movable conical disk to the shaft. In the case when the distance between the conical disks is small, the inner of the two axially offset bore holes is closed off by the inner centering guide portion of the conical disk and the outer of the two axially offset bore holes is connected to the connector bore hole.

To the extent that the foregoing solutions include an axial groove, it is advantageous if the latter is formed in the area of the attachment that prevents rotational but permits axial relative movement between the movable conical disk and the shaft.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DETAILED DESCRIPTION OF THE INVENTION

Figure 1A:
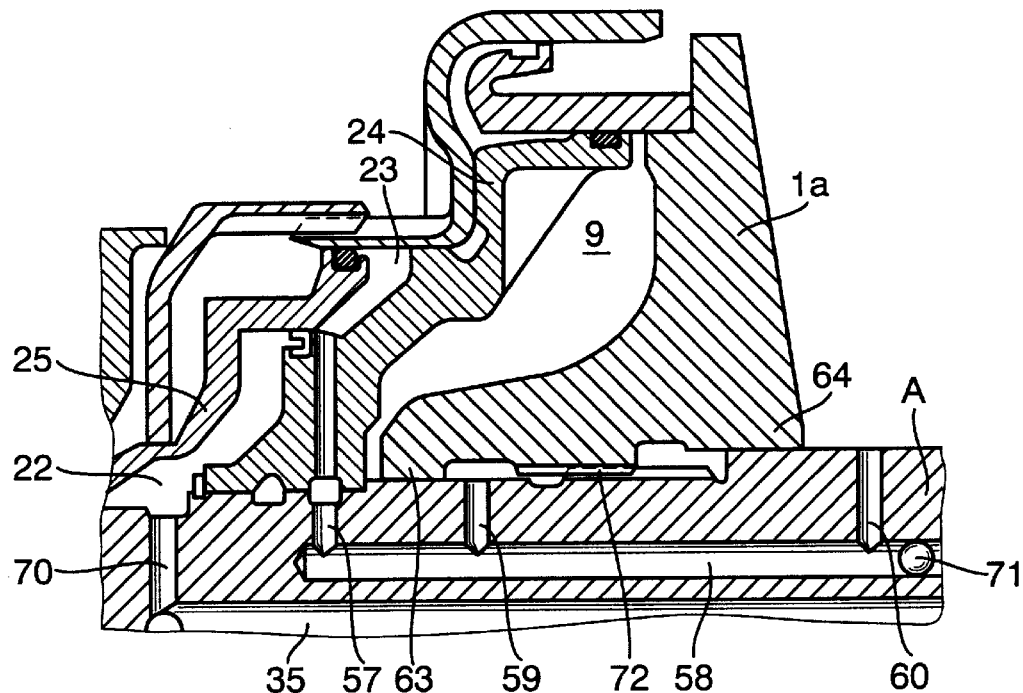
FIGS. 1 through 6 represent in sectional view details of different embodiments of a movable conical disk with the appurtenant pressure compartments acting together with channels inside the shaft, where each of the figures designated with a) shows the movable conical disk at maximum distance from the other conical disk, and each of the figures designated with b) shows the movable conical disk at minimum distance from the other conical disk of the conical disk pair.
Figure 8:
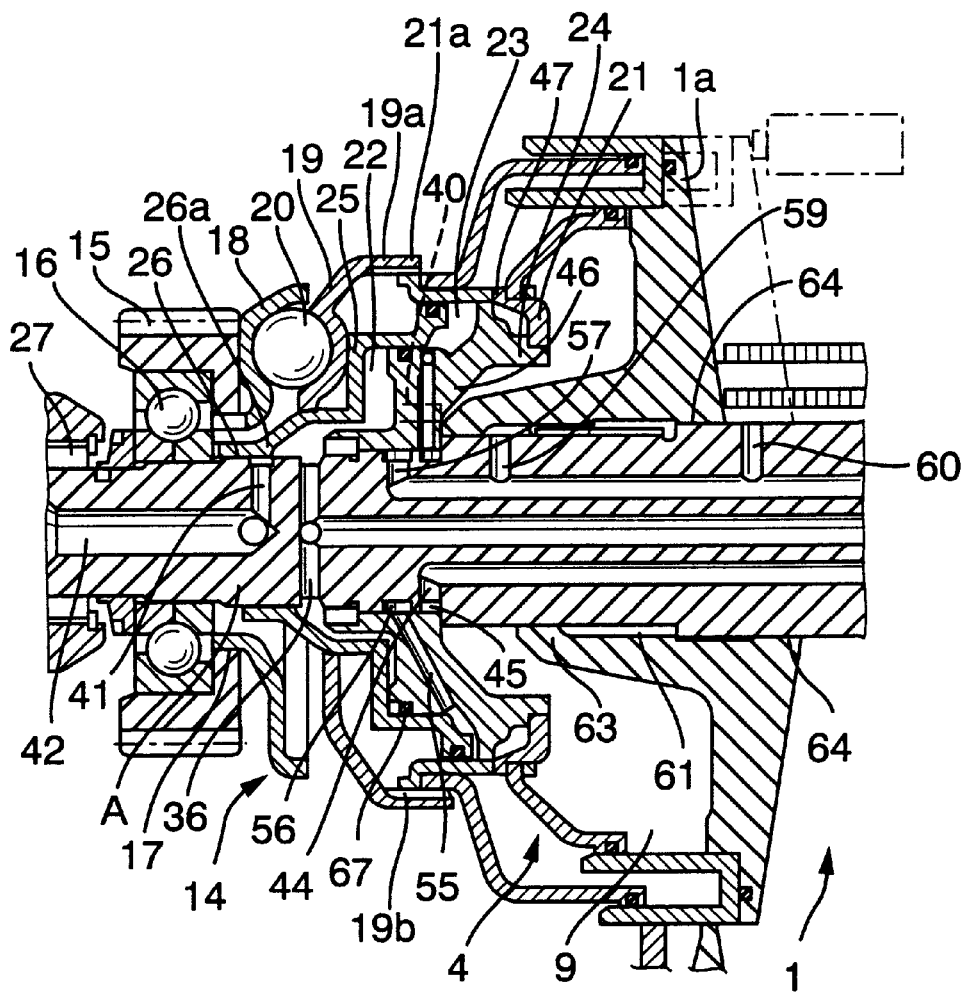
FIG. 8 represents a detail view of the cone-pulley transmission of FIG. 7.

FIGS. 1a) and 1b) represent a portion of the cone-pulley transmission of FIG. 8 and are provided for the purpose of making the functional explanation more transparent, using the same reference symbols as in FIG. 8 but showing only those reference symbols that belong to essential parts.

The first pressure compartment 22 adjoins the piston-like component 25 to which a torque-dependent amount of force is being applied. The first pressure compartment 22 also adjoins the component 24 which is fixedly connected to shaft A; and it connects via a tap hole 70 to the central axial bore hole 35 of shaft A which, in turn, is connected to a pump. When the amount of torque is large (component 25 sliding to the right), an outlet channel 41 (as shown in FIG. 8, but outside the range of FIGS. 1a) and 1b)) is to an increasing degree closed off so that the pressure inside the first pressure compartment 22 supplied by the pump, and along with it the system pressure, is increased depending on the amount of torque.

When the conical disk 1a is in the position shown in FIG. 1a), the second pressure compartment 23 adjoining the piston-like component 25 and located at a radial distance outside of the first pressure compartment 22 communicates via a connecting channel leading through the component 24 with the radial bore hole 57 of shaft A. The radial bore hole 57, in turn, via the axial bore hole 58 and the radial bore hole 60 leads into the conical space outside of shaft A. Accordingly, the second pressure compartment 23 is not pressurized or, more precisely, is under the same pressure as the conical space. Beyond the radial bore hole 60, the axial bore hole 58 is closed off by a stopper 71.

Issuing from the axial bore hole 58, a further radial bore hole 59 leads into the area 72 where the conical disk 1a is connected to and constrained to share the rotation of shaft A.

Figure 1B:
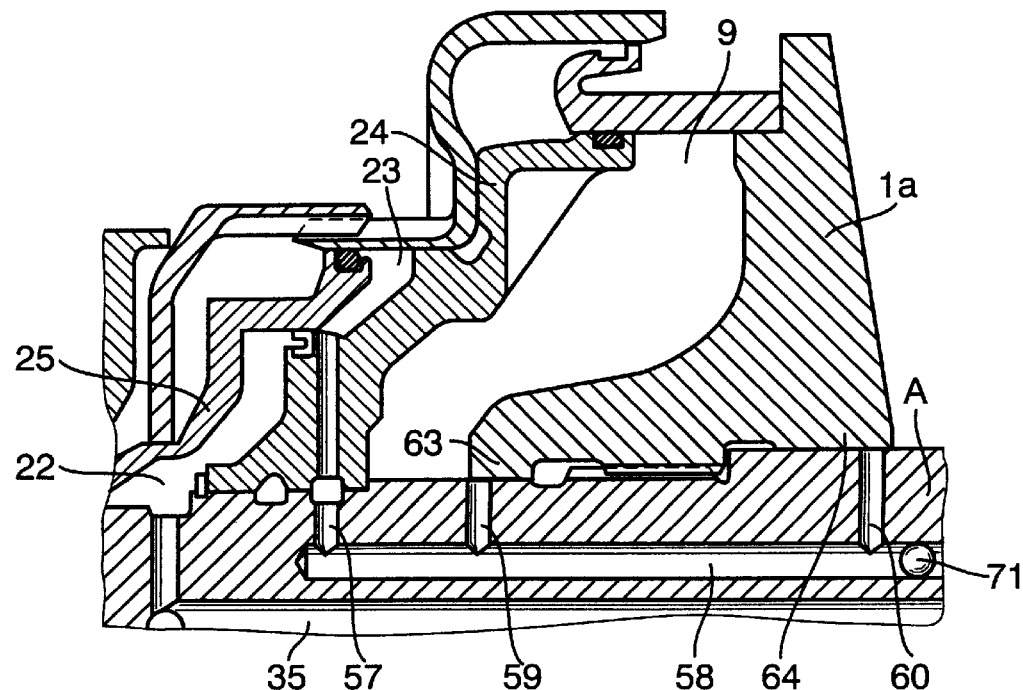

When the conical disk 1a is in the position shown in FIG. 1b) (having moved to the right relative to the position shown in FIG. 1a)), the centering guide portion 64 of conical disk 1a slides over the radial bore hole 60, and the centering guide portion 63 at least partially opens up the orifice of radial bore hole 59 so that the pressure chamber 9 communicates with the second pressure compartment 23 as is known from DE 195 44 644 A1.

The bore holes in shaft A that serve to turn the second pressure compartment 23 on and off depending on the transmission ratio and whose openings interact with the centering-guide portions 63 and 64 of the conical disk 1a are relatively expensive to manufacture. In addition, there are relatively large leakage losses.

Figure 2A:
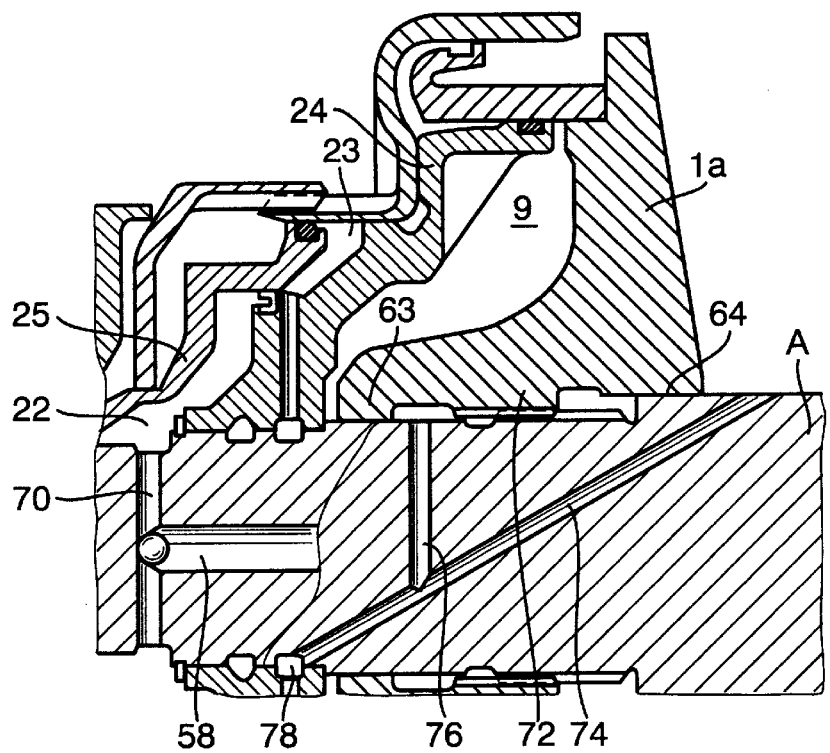
Figure 2B:
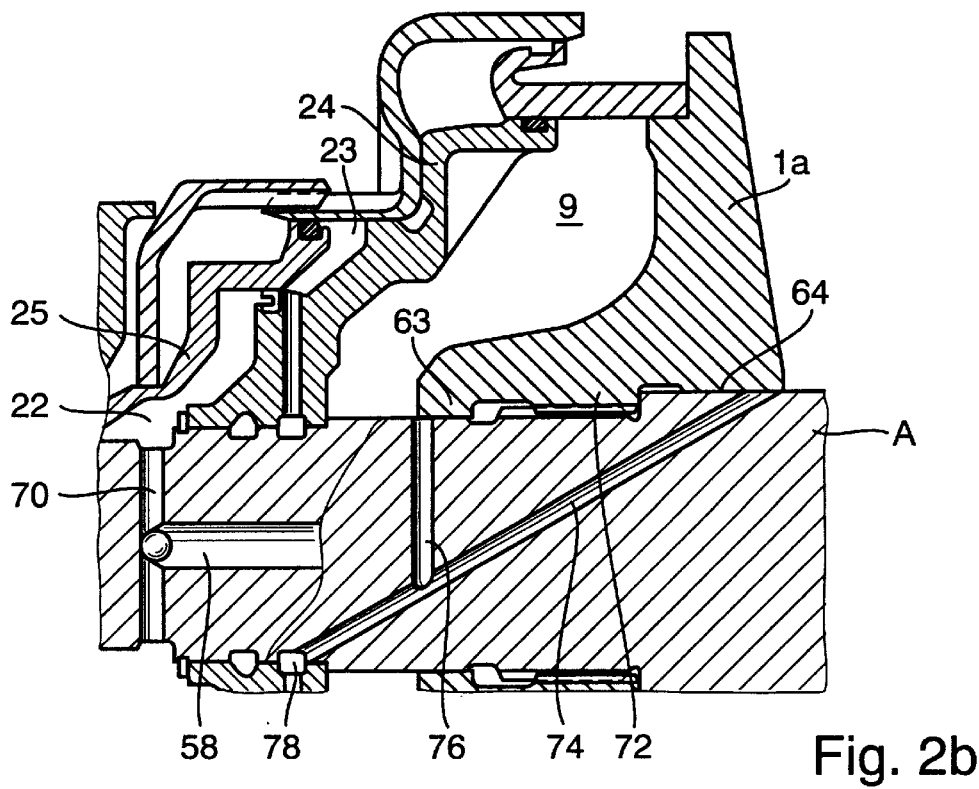

FIGS. 2a) and 2b) show a modified embodiment of the arrangement according to FIG. 1 as follows:

The axial bore hole 58 of the embodiment according to FIG. 1 with stopper 71 and radial bore holes 57, 59 and 60 is replaced in the embodiment according to FIG. 2 by a bore hole 74 traversing the shaft A at an oblique angle and a tap hole 76 leading into the oblique bore hole 74. The oblique bore hole 74 starts from a ring-shaped channel 78 formed between shaft A and component 24 and communicating with the second pressure compartment 23 by means of a connection through component 24. The tap hole 76 in the position of the conical disk 1a shown in FIG. 2b) starts from the area 72. In the position of the conical disk 1a as shown in FIG. 2a), the oblique bore hole 74 leads from the ring groove 78 to the conical space confined between the conical disks on the outside of shaft A.

When the conical disk 1a is in the position shown in FIG. 2b), the oblique bore hole 74 is closed off by the centering guide portion 64 of conical disk 1a, and the orifice of tap hole 76 is at least partially laid open by the centering guide portion 63 of conical disk 1a so that pressure chamber 9 communicates with the second pressure compartment 23.

As an advantage of the embodiment of FIG. 2 in comparison to the embodiment of FIG. 1, there are only two bore holes to be made and stopper 71 has been eliminated. It is to be understood that the bore holes 74 and 76 are offset in the radial direction from the axial bore hole 58 that communicates with pressure compartment 22.

The tap hole 76 may run in a radial or oblique direction.

Figure 3A:
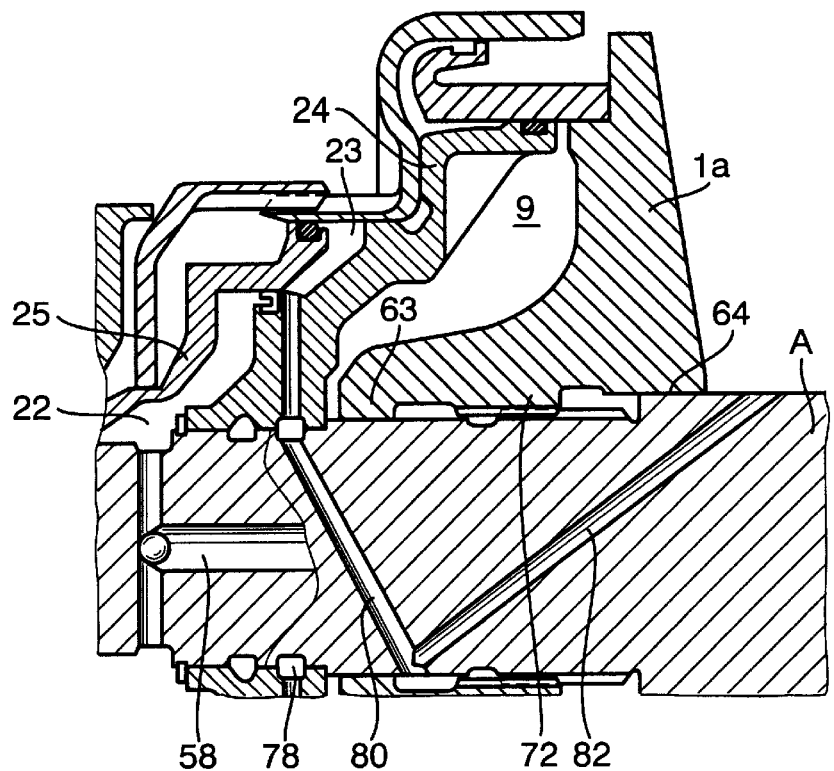

Functionally, the embodiment shown in FIG. 3 is largely similar with the embodiment of FIG. 2. The blind bore hole 76 of FIG. 2 is replaced here by an oblique bore hole 80 that traverses the shaft and, when the conical disk 1a is in the position shown in FIG. 3a), leads from the ring groove 78 that communicates with the second pressure compartment 23 to the area 72 which is sealed off in the axial direction by the centering guide portions 63 and 64. A further oblique bore hole 82 opens into the oblique bore hole 80 and, when the conical disk is in the position shown in FIG. 3a), leads into the conical space between the conical disks.

Figure 3B:
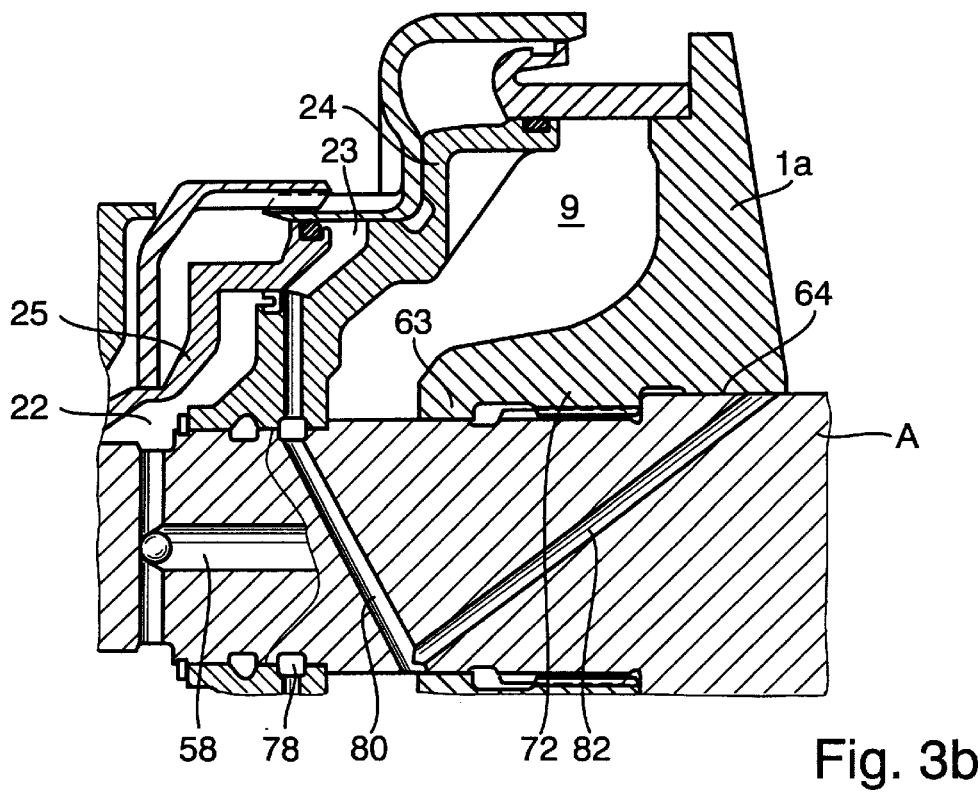

As may be seen from the drawing, when the conical disk 1a is in the position shown in FIG. 3b), it closes off the orifice of oblique bore hole 82 from the outside and partially opens the orifice of oblique bore hole 80 so that the latter communicates with pressure chamber 9.

The embodiment according to FIG. 3 in comparison to the embodiment of FIG. 2 is advantageous from a manufacturing point of view because the oblique bore holes run at a steeper angle to the shaft surface and are therefore easier to produce.

Figure 4A:
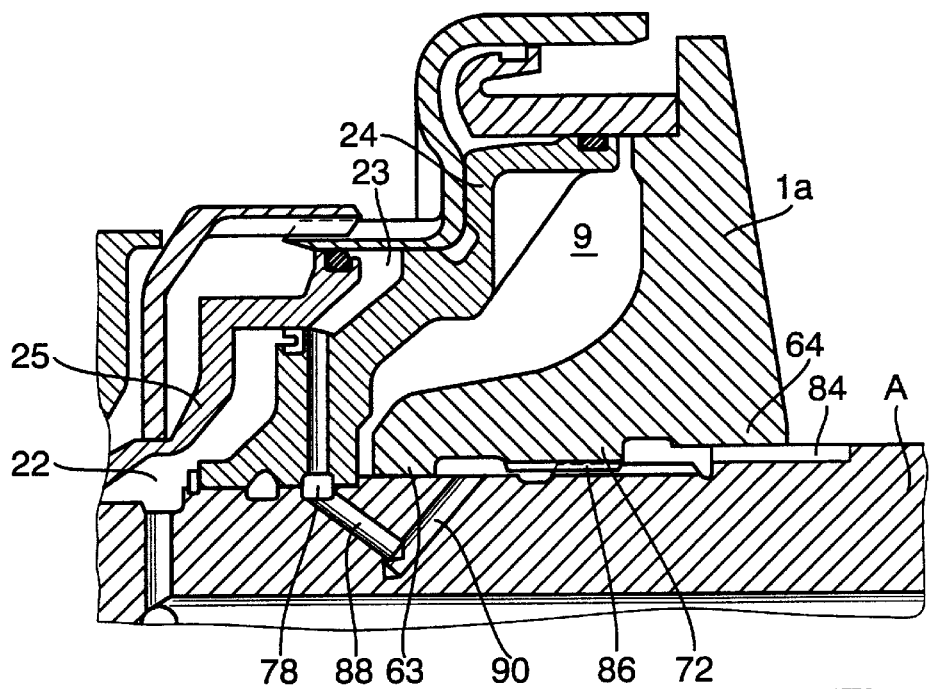

In the embodiment according to FIG. 4, the shaft A has an axial groove 84 that is partially laid open to the outside by the centering guide portion 64 when the conical disk 1a is in the position shown in FIG. 4a). The area 72 where the torque is transmitted between the conical disk 1a and the shaft A is formed as an axial channel 86, e.g., by omitting a spline in a spline coupling. From the ring groove 78 that communicates with the second pressure compartment 23, an oblique bore hole 88 originates and is joined inside shaft A by a further oblique bore hole 90 originating from the area 72 or, more precisely, from the axial channel 86.

When the conical disk 1a is in the position shown in FIG. 4a), the second pressure compartment 23 communicates via oblique bore holes 88 and 90, axial channel 86 and axial groove 84 with the conical space between the conical disks.

Figure 4B:
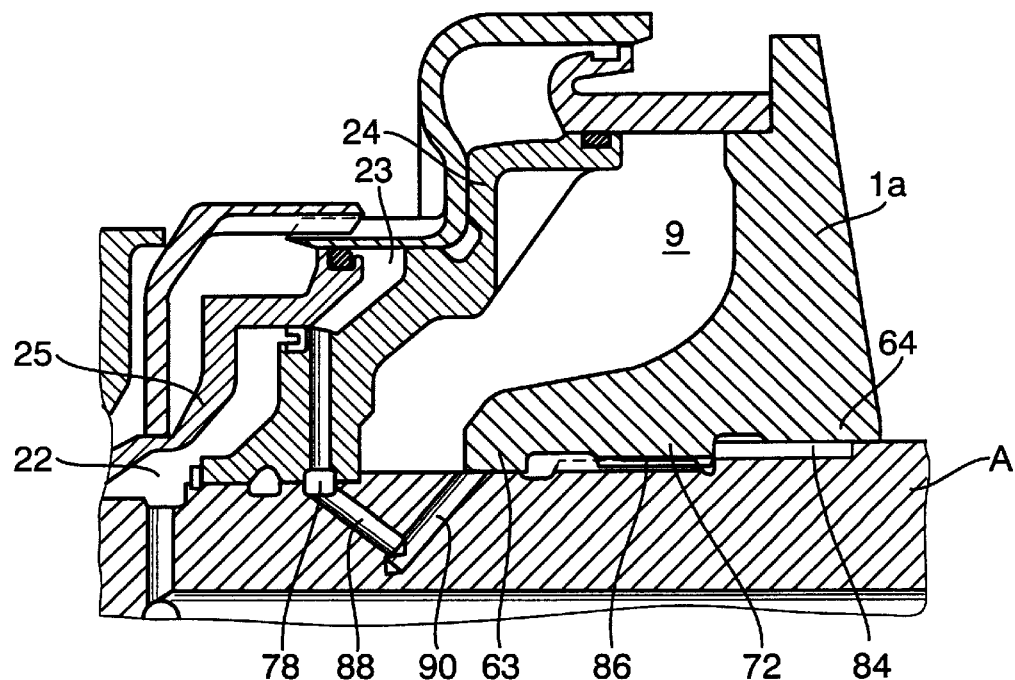

In the position shown in FIG. 4b), the conical disk 1a has moved so far to the right that the centering guide portion 63 has moved beyond the orifice of oblique bore hole 90 and the latter is connected at least partially with the pressure chamber 9.

It is to be understood that bore holes 88 and 90 in FIG. 4 could be replaced by bore hole 80 of FIG. 3 or by an arrangement of bore holes similar to FIG. 2.

It is further to be understood that the bore holes do not necessarily have to be produced by a process of boring but could also be formed as channels that are generated, e.g., in the casting process of the shaft.

FIG. 5 shows a variation in which the version of FIG. 4 is further developed in a certain manner.

The ring groove 78 that communicates with the second pressure compartment 23 is connected via channels or bore holes formed inside shaft A with an axial groove 92 of shaft A that is somewhat shorter than the axial groove 84 (FIG. 4).

Figure 5A:
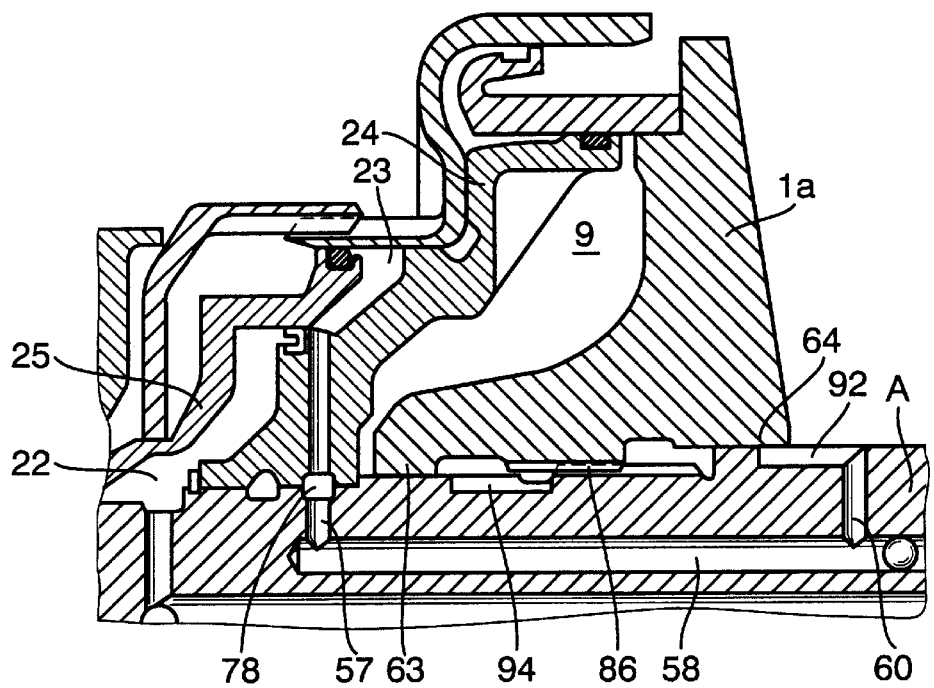

When the conical disk 1a is in the position shown in FIG. 5a), the axial groove 92 is laid open by the centering guide portion 64 so that the second pressure compartment 23 communicates with the exterior space outside of shaft A. At the same time, the centering guide portion 64 separates the axial groove 92 from the axial channel 86 formed in the area where the torque is transmitted between the conical disk 1a and the shaft. According to FIG. 5, the axial channel 86 continues to the left into a further axial groove 94 of shaft A.

Figure 5B:
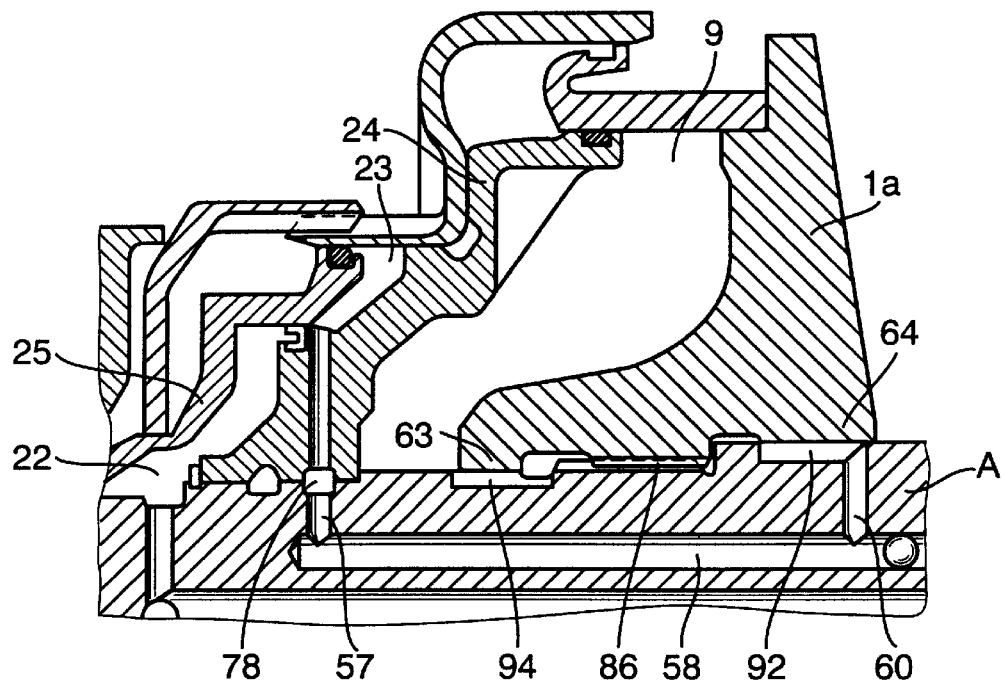

When the conical disk 1a is in the position shown in FIG. 5b, the centering guide portion 64 has slid over the axial channel 92 so that the latter is sealed towards the outside and communicates on the inside via a recess formed in conical disk 1a with the axial channel 86 which, in turn, is connected to the pressure chamber 9 so that, overall, pressure compartment 23 has the same pressure as pressure chamber 9.

It is to be understood that the channel running from the ring groove 78 to the axial groove 92 can be realized in the form of oblique bore holes.

With the embodiment according to FIG. 5, leakage losses are reduced because in the position shown in FIG. 5a) both centering guide portions 63 and 64 by which the conical disk 1a is in tight contact with shaft A are acting as seals so that the pressure chamber 9 is to a large extent sealed off towards the outside.

FIG. 6 shows a further embodiment of the arrangement for turning the second pressure compartment 23 on and off.

In comparison to the embodiment of FIG. 1, the radial bore hole 59 has been omitted and a further radial bore hole 96 is provided to the left of radial bore hole 60. Further, a connecting bore hole 98 traverses the conical disk 1a and leads into a ring-shaped recess 100 formed next to the centering guide portion 64 in the conical disk 1a.

Figure 6A:
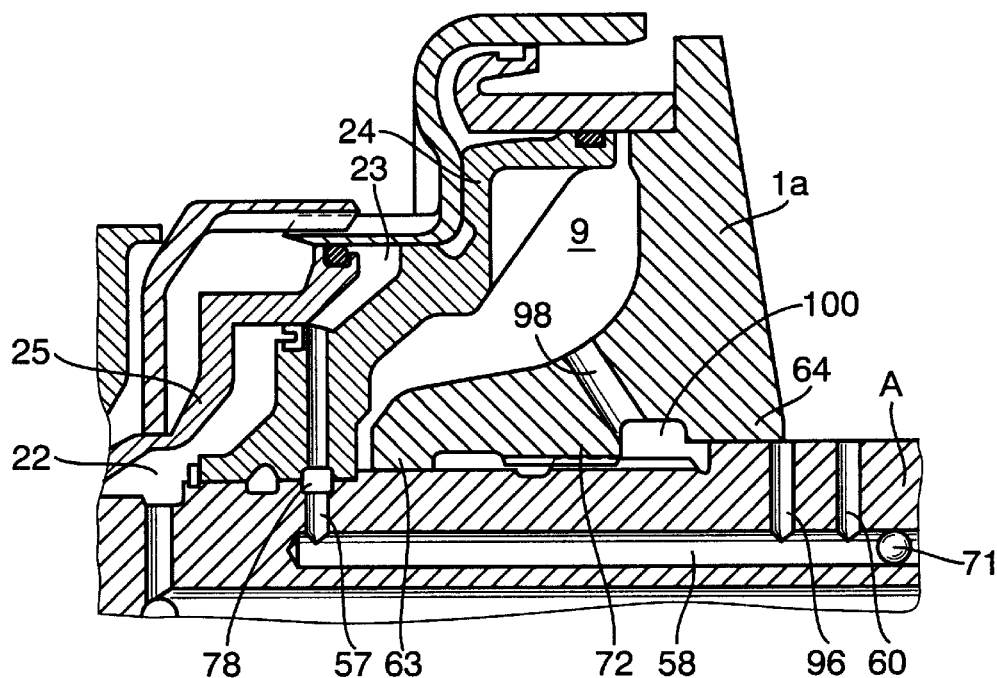

The arrangement of channels and recesses is such that when the conical disk is in the position shown in FIG. 6a), the radial bore hole 60 is laid open, whereby the second pressure compartment 23 becomes connected to the conical space between the conical disks, i.e., to the exterior space outside of shaft A.

Figure 6B:
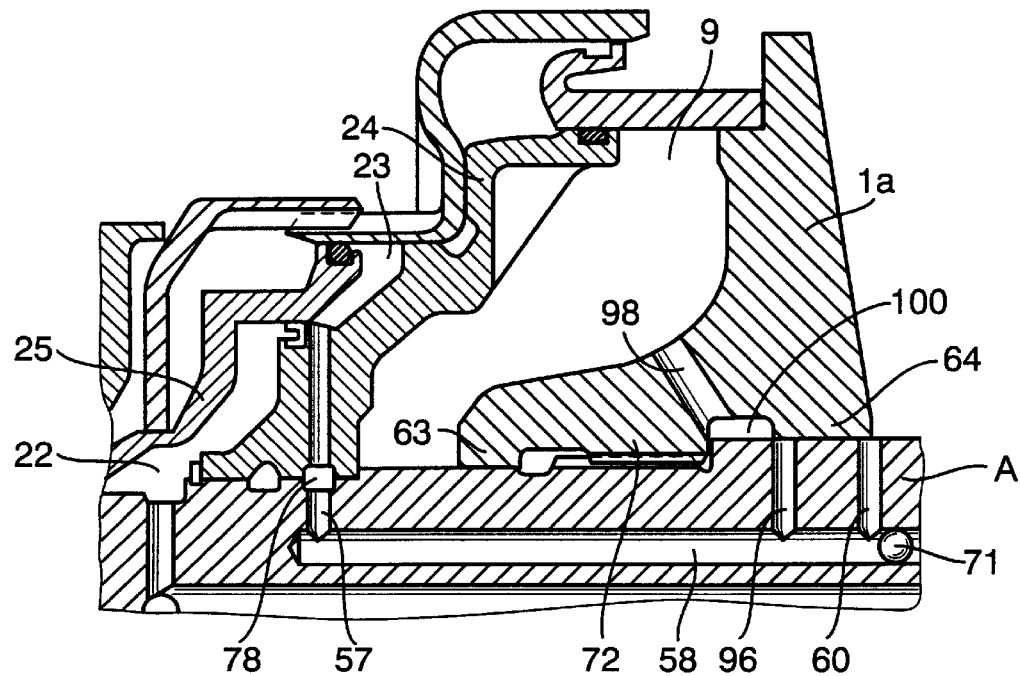

When the conical disk is in the position shown in FIG. 6b), the radial bore hole 60 is closed off by the centering guide portion 64 and the radial bore hole 96 is at least partially laid open so that the radial bore hole 96 communicates via the recess 100 and the connecting bore hole 98 with the pressure chamber 9, whereby the second pressure compartment 23 becomes connected with the pressure chamber 9.

As an advantage of the embodiment of FIG. 6 in comparison to the embodiment of FIG. 1, when the conical disk 1a is in the position shown in FIG. 6a), the centering guide portion 64 acts as a seal for the pressure chamber 9, whereas in the embodiment of FIG. 1a), this function is performed by the centering guide portion 63. However, the amount of deformation caused by the forces that the endless loop means introduces into the conical disk 1a is greater in the centering guide portion 63 than in the centering guide portion 64.

It is to be understood that the axial bore holes or axial channels shown in the different embodiments can to a large extent be replaced by radial channels or oblique bore holes that are easier to produce.

Figure 7:
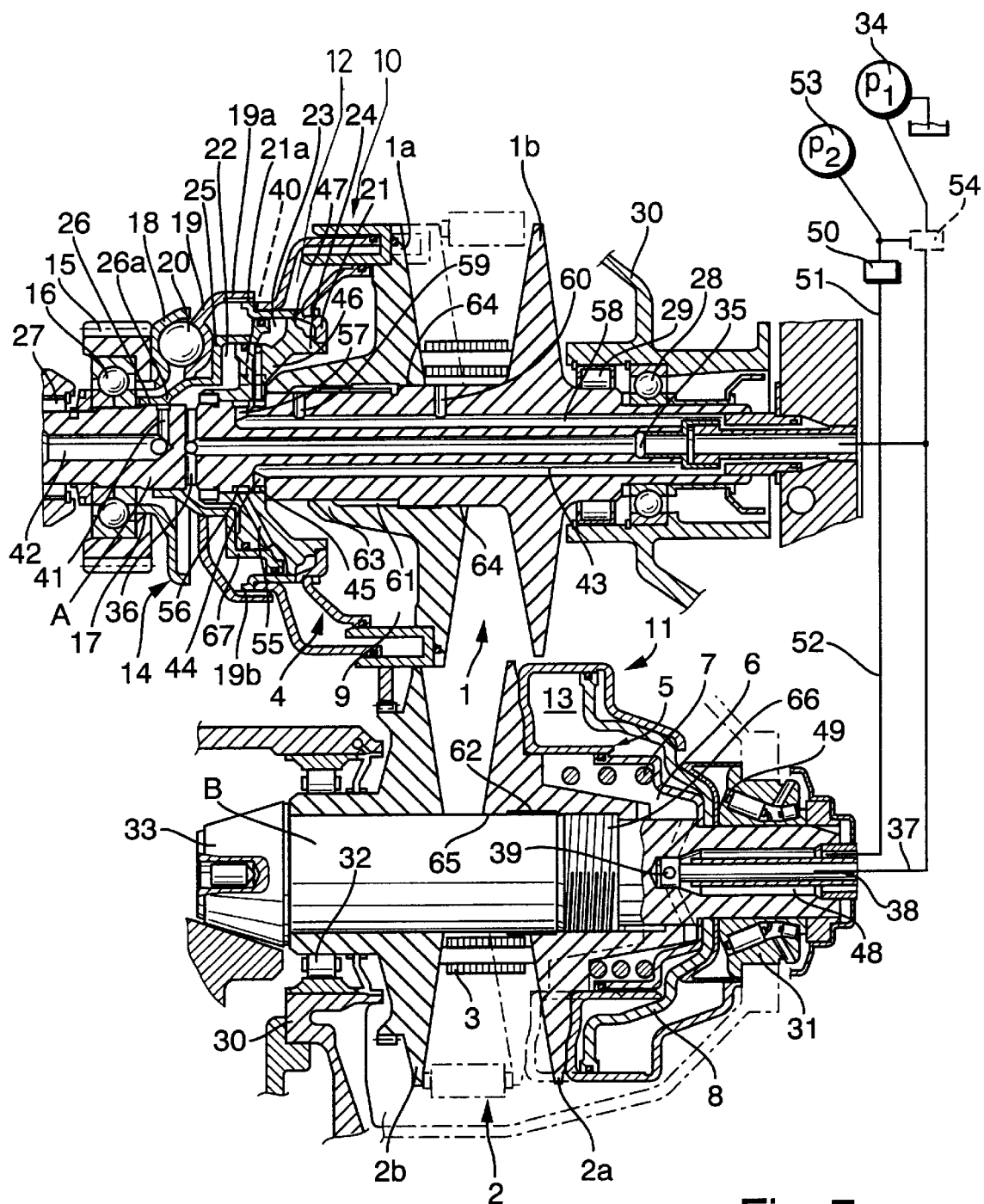
FIG. 7 represents a sectional view of a cone-pulley transmission.

In FIG. 7, the upper half of the representation of the disk pair 1 and the upper half of the representation of the disk pair 2 show the respective relative axial positions of the conical disk pairs 1a, 1b and 2a, 2b corresponding to the slow end of the transmission range (underdrive), while the lower half of the same representations shows the respective relative axial positions of the conical disk pairs 1a, 1b and 2a, 2b corresponding to the fast end of the transmission range (overdrive).

The disk pair 1 can be tightened in the axial direction through an actuator 4 configured as a piston/cylinder unit. In similar manner, the disk pair 2 can be axially tightened against chain 3 through an actuator 5, also configured as a piston/cylinder unit. In the pressure chamber 6 of the piston/cylinder unit 5, a force storage device 7 is provided in the form of a helix spring urging the axially movable disk 2a towards the axially fixed disk 2b. When, in the driven part of the system, the chain 3 is in a radial position closer to the center of disk pair 2, the tightening force applied by the force storage device 7 is greater than when the chain 3 is in a radial position farther from the center of disk pair 2. This means that as the transmission ratio is increased towards a faster output, the force applied by the force storage device 7 also increases. The helix spring 7 at one end bears immediately against the axially movable disk 2a and at the other end against a cup-shaped component 8 that delimits the pressure chamber 6 and is rigidly connected with the driven shaft B.

Acting in parallel with the piston/cylinder units 4 and 5, respectively, additional piston/cylinder units 10 and 11 are provided for the purpose of varying the transmission ratio. The pressure chambers 12, 13 of the piston/cylinder units 10, 11 can be alternatively filled with or emptied of pressure medium according to the required transmission ratio. For this purpose, the pressure chambers 12, 13 in accordance with requirements can be connected either to a source of a pressure medium such as a pump or else to an outlet channel. Thus, when the transmission ratio is to be changed, one of the pressure chambers 12, 13 is filled with pressure medium, i.e., its volume is increased, while at the same time the other of the pressure chambers 12, 13 is at least partially emptied, i.e., its volume is decreased. This reciprocal pressurizing and emptying of pressure chambers 12 and 13, respectively, can be performed by means of a suitable valve. Concerning the design and the function of this kind of a valve, reference is made in particular to the aforementioned existing state of the art. Thus, e.g., in DE-OS 40 36 683 a valve 36 is proposed in FIG. 2 in the form of a square slide valve supplied from a pressure medium source 14 in the form of a pump.

To generate an at least torque-dependent pressure, a torque sensor is provided whose function is based on a hydromechanical principle. The torque, which is introduced through a driving gear or driving pinion 15, is transmitted by the torque sensor 14 to the conical disk pair 1. The driving gear 15 is mounted on the driving shaft A with a roller bearing 16 and has a form-fitting connection or spline coupling 17 causing it to share its rotation with the cam disk 18 of the torque sensor 14 that also bears against the driving gear 15 in the axial direction. The torque sensor 14 has the axially fixed cam disk 18 and an axially movable cam disk 19, both of which have sloped ramps, with space-holding bodies in the form of spherical balls 20 being arranged between the ramps so as to spread the cam disks apart. The cam disk 19 is movable in the axial direction along the shaft A, but is constrained to rotate together with the latter. For this purpose, the cam disk 19 has a portion 19a facing in the opposite axial direction from the spherical balls 20 as well as facing outward in the radial direction and carrying a set of splines 19b engaged in a complementary-shaped spline fitting 21a of a component 21. The latter has a fixed connection preventing both axial as well as rotational motion of the component 21 in relation to shaft A. At the same time, the spline 19b and its counterpart, spline 21a, are shaped in relation to each other in a manner that will allow an axial displacement between the components 19 and 21.

The components of the torque sensor 14 enclose two pressure compartments 22, 23. The pressure compartment 22 is delimited by a ring-shaped component 24 that is rigidly connected with the driving shaft A as well as by portions or components 25, 26 that are formed on or attached to the cam disk 19. The ring-shaped pressure compartment 23 is arranged at a greater radial distance than the ring-shaped pressure compartment 22 but is offset from the latter in the axial direction. The second pressure compartment 23, too, is delimited by the ring-shaped component 24 and also by the sleeve-like component 21 and further by the ring-shaped component 25, which has a fixed connection to cam disk 19, is axially movable and functions in the manner of a piston.

The input shaft A, which carries the torque sensor 14 and the conical disk pair 1, is supported inside a housing 30 by a needle bearing 27 at the end near the torque sensor 14 and at the opposite side of the conical disk pair 1 by a ball bearing 28 taking up the axial forces and a roller bearing 29 taking up radially directed forces. The driven shaft B which carries the driven disk pair 2 is supported in the housing 30 by a dual taper roller bearing 31 at the end adjacent to the actuators 5 and 11, taking up forces in the radial as well as both axial directions. At the far side from actuators 5 and 11, the driven shaft B is supported by a roller bearing 32. The driven shaft B at the far end relative to actuators 5 and 11 carries a bevel gear 33 that is functionally connected to, e.g., a differential.

To generate the pressure that is being modulated by the torque sensor 14 dependent on at least the torque and that is required for tightening the continuously variable cone-pulley transmission, a pump 34 is provided which, via a central axial channel 35 inside shaft A leading to at least one radial channel 36, communicates with the pressure compartment 22 of the torque sensor 14. The pump 34 is further connected via a connecting conduit 37 with the pressure chamber 6 of the piston/cylinder unit 5 associated with the second disk pair 2. The connecting conduit 37 leads to a central axial channel 38 running inside the driven shaft B which, in turn, leads to the pressure chamber 6 via at least one radially oriented channel 39.

The pressure compartment 22 of the torque sensor 14 communicates with the pressure chamber 9 of the piston/cylinder unit 4 via the channel 40, which is offset in the circumferential direction relative to the sectional plane of FIG. 7 and is therefore drawn with broken lines. The channel 40 runs through the ring-shaped component 24 that is rigidly connected to shaft A. Thus, there is a permanent connection between the first pressure compartment 22 and the pressure chamber 9. The driving shaft A is further provided with at least one outlet channel 41 that is connected, or can be connected, with the pressure compartment 22 and whose outlet cross-section is variable as a function of at least the transmitted torque. The outlet channel 41 opens to a central axial bore hole 42 of shaft A which, in turn, may be connected to a conduit that allows the oil drained from the torque sensor to be directed to locations where it may be used for the lubrication of component parts. The inner portion 26a of the ramp disk or cam disk 19 that is supported in an axially movable connection on the driving shaft A forms a closure means for the outlet channel 41 that can close off the outlet channel 41 to a greater or lesser extent dependent on at least the torque that exists at the particular instant. Thus, the closure means 26a in combination with the outlet channel 41 forms a valve, or more precisely, a throttle. In function of at least the torque existing between the two cam disks 18 and 19, the outlet opening or the outlet channel 41 is opened or closed to a commensurate degree by the disk 19 acting as a control piston, whereby an amount of pressure originating from the pump 34 and corresponding to at least the currently existing torque is introduced at least into the pressure compartment 22. Because the pressure compartment 22 is connected to the pressure chamber 9 and also communicates with the pressure chamber 6 via the channels or conduits 35, 36, 37, 38 and 39, a corresponding pressure is generated also in pressure chambers 9 and 6.

Because the piston/cylinder units 4, 5 are arranged in parallel with the piston/cylinder units 10, 11, the forces generated by the torque sensor 14 and acting on the axially movable disks 1a, 2a are added to the forces bearing against the axially movable disks 1a, 2a from the pressure in the chambers 12, 13 that serves to set the transmission ratio.

The pressure chamber 12 is supplied with pressure medium through a channel 43 provided inside the shaft A which through a radial bore hole 44 is connected to a ring groove 45 on shaft A. Starting from the ring groove 45, at least one channel 46 traverses the ring-shaped component 24 and forms a connection to the radial passageway 47 traversing the sleeve-shaped component 21 and opening to the pressure chamber 12. In a similar manner the pressure chamber 13, too, is supplied with oil, namely via the channel 48 that surrounds the channel 38 and communicates through radially directed connector channels with the pressure chamber 13. The channels 43 and 48 are supplied from a common pressure source through connecting conduits 51, 52 with at least one valve 50 arranged in between. The pressure source 53 that is connected to the valve 50 or valve system 50 can be configured as a separate pump, or else it can also be the already existing pump 34, in which case an appropriate volume- or pressure-distributing system 54 is required that can comprise a plurality of valves. This alternative solution is indicated with a broken line.

In the relative position of the individual components as shown in the upper half of the representation of the disk pair 1, the pressure compartment 23, whose pressure supply effectively parallels the pressure compartment 22, is separated from a pressure supply, the reason being that the channels or bore holes 55, 56, 57, 58, 59, 60 that communicate with the pressure compartment 23 are not connected with a source of pressure medium such as, in particular, the pump 34. In the illustrated position of the axially movable disk 1a, the radial bore hole 60 is fully open so that the compartment 23 is fully relieved from pressure. The axial force acting on the cam disk or ramp disk 19 that is generated by the torque to be transmitted is taken up only through the oil pressure cushion building up in the pressure compartment 22. In this, the higher the pressure in pressure compartment 22 is at a given time, the higher the amount of torque to be transmitted. As already mentioned, this pressure is controlled by the inner portion 26a of cam disk 19 and the outlet bore hole 41 acting together as a throttle valve.

When the transmission ratio is changed to a faster output, the conical disk 1a is moved to the right in the direction towards the conical disk 1b. This has the effect on the conical disk pair 2 of the conical disk 2a backing up from the axially fixed conical disk 2b. As already mentioned, the upper halves of the representations of the conical disk pairs 1, 2 illustrate the relative positions between the conical disks 1a, 1b and 2a, 2b corresponding to the slow end of the transmission range, while the lower halves of the same representations illustrate the relative positions between the conical disks 1a, 1b and 2a, 2b corresponding to the fast end of the transmission range.

In order to shift from the transmission ratio of the conical disk pairs 1, 2 illustrated in the upper halves of the representations to the transmission ratio illustrated in the respective lower halves, appropriate control is applied to the valve 50 so as to fill the pressure chamber 12 and to empty or commensurately reduce the volume of pressure chamber 13.

The axially displaceable conical disks 1a, 2a are coupled to their respective associated shafts A and B through connections 61, 62 by means of splines. The connections 61, 62 formed by spline fittings on the disks 1a, 2a and by outward-facing splines on the shafts A and B allow the disks to move in the axial direction along the respective shafts A, B while constraining the disks to rotate together with the respective shafts A, B.

The position of the axially displaceable disk 1a and of the chain 3 as shown in dash-dotted lines in the upper half of the representation of the driving disk pair 1 corresponds to the fastest possible transmission ratio. The position of the chain 3 and disk set 1 drawn in dash-dotted lines corresponds to the position of the chain 3 as drawn in solid lines in the lower half of the representation of the driven disk pair 2.

The position of the axially displaceable disk 2a and of the chain 3 as shown in dash-dotted lines in the lower half of the representation of the driven disk pair 2 corresponds to the slowest possible transmission ratio. This position of the chain 3 corresponds to the position of the chain 3 drawn in solid lines in the upper half of the representation of the first disk set 1.

In the embodiment shown, the conical disks 1a, 2a at their inside radii are provided with centering guide portions 63, 64 and 65, 66, respectively, by which they are in immediate contact with and centered on the respective shafts A and B.

The centering guide portions 63, 64 of the axially displaceable disk 1a, contacting the outer surface of shaft A practically without radial play, in combination with the channels 59, 60 are functioning as valves in which the disk 1a in relation to the channels 59, 60 effectively serves as the valve gate. When the disk 1a is displaced to the right from the position shown in the upper half of the representation of the disk set 1, after a certain amount of travel the channel 60 is gradually closed off by the centering guide portion 64 as the axial displacement increases. In other words, the centering guide portion 64 is now positioned in the radial sense above the opening of channel 60. In this position, the channel 59, too, is closed off at its outer radial end by the conical disk 1a, i.e., by the centering guide portion 63. As the disk 1a is moved further in the axial direction towards the disk 1b, the channel 60 remains closed while on the other hand the disk 1a, i.e., its centering guide portion 63, gradually opens the channel 59. Thereby a connection is established between the pressure chamber 9 of the cylinder/piston unit 4 and the channel 58 via the channel 59 whereby, in turn, a connection to the pressure compartment 23 is made via channels 57, 56 and 55. Given that the channel 60 is effectively closed and a connection now exists between the pressure chamber 9 and the two pressure compartments 22 and 23, the pressure (except for small losses that may occur in the connecting path) will effectively be equalized between the two pressure compartments 22, 23 and the pressure chamber 9 and thus also in the chamber 6, the latter being effectively connected with the compartments 22, 23 and the chamber 9 through the channel 35 and the conduits 37, 38. As the two pressure compartments 22 and 23 are connected to a degree that depends on the transmission ratio, the effective axially facing surface of the pressure cushion in the torque sensor 14 is increased because the combined effects of the axially facing surfaces of the two pressure compartments 22, 23 are additive. Due to this increase in the effective axially directed thrust surface, the amount of pressure generated by the torque sensor in relation to a given amount of torque is reduced essentially in proportion to the surface increase which, in turn, means that a corresponding decrease in pressure is also found in the pressure chambers 9 and 6. Accordingly, by means of the inventive torque sensor 14 it becomes possible to effect a transmission-ratio-dependent modulation of the pressure that is superimposed on the torque-dependent modulation of the pressure. The torque sensor 14 as described allows, in effect, a two-stage modulation of the amount or level of pressure.

In the embodiment described, the two channels 59, 60 in relation to each other and in relation to the portions 63, 64 of the disk 1a that interact with the channels 59, 60 are arranged or configured in such a manner that the shift from the one pressure compartment 22 to both pressure compartments 22, 23 and vice versa occurs at a transmission ratio of the continuously variable cone-pulley transmission of approximately 1:1. As indicated previously, due to the design configuration it is not possible for a shift of this kind to occur abruptly, meaning that there is a transition range where on the one hand the outlet channel 60 is already closed but on the other hand the connector channel 59 is not yet connected to the pressure chamber 9. In order to ensure the function of the transmission, i.e., of the torque sensor 14, in this transition range, which requires providing a possibility for the cam disk 19 to be moved along the axial direction, there are equalizer means provided to allow the volume of the pressure compartment 23 to be changed so that the torque sensor 14 can perform its pump action, meaning that the cylinder components and the piston components of the torque sensor 14 can move relative to each other in the axial direction. In the embodiment shown, the aforementioned equalizer means are provided in the form of a sealing tongue or lip 67, which is seated in a radial groove of the ring-shaped component 24 and interacts with the inner cylinder surface of the component 25 in order to seal the two pressure compartments 23, 24 in relation to each other. The seal ring 67 is shaped and arranged in such a manner that it blocks passage, i.e., prevents pressure equalization between the compartments 22 and 23, only in one axial direction while permitting pressure equalization, i.e., passage of the seal ring 67, to occur in the opposite direction at least as long as there is a positive pressure differential between the pressure compartment 23 and the pressure compartment 22. Thus, the seal ring 67 works similar to a check valve in that the flow from the pressure compartment 22 to the pressure compartment 23 is blocked while passage of the seal formed by the seal ring 67 is possible when there is a certain amount of overpressure in the pressure compartment 23 relative to the pressure compartment 22. Accordingly, when the ramp disk 19 moves to the right, pressure fluid is allowed to flow from the closed-off pressure compartment 23 into the pressure compartment 22. If the cam disk 19 is subsequently moved to the left, a condition of underpressure may occur in the pressure compartment 23, including even the possibility of air bubbles forming in the oil. However, this is not harmful to the function of the torque sensor or to the continuously variable cone-pulley transmission.

Instead of the seal 67 functioning similarly to a check valve, one could also provide an actual check valve between the two pressure compartments 22, 23 that would be installed in the ring-shaped component 24. In this case, it would be possible to use a seal 67 that works in both axial directions. Further, the check valve referred to above could also be arranged in such a manner that it would act between the two channels 35 and 58. In this case, the check valve has to be oriented in such a way that a volume flow is possible in the direction from the pressure compartment 23 to the pressure compartment 22 but passage is blocked in the opposite direction.

As can be seen from the preceding functional description, practically over the entire part of the range where the transmission effects a speed reduction (underdrive), the axial force transmitted between the ball ramps of the cam disks 18, 19 bears against the effective axial thrust surface formed by the pressure compartment 22 alone. In contrast, practically over the entire part of the range where the transmission effects a speed increase (overdrive), the axial force transmitted between the ball ramps of the cam disks 18, 19 bears against both of the effective axial thrust surfaces formed by the pressure compartments 22, 23. Thus, in relation to a given input torque, the pressure generated by the torque sensor is higher when the transmission works in a speed-reducing mode than when it works in a speed-increasing mode. As already mentioned, the transmission described here is configured in such a manner that the switch-over point where a connection or separation between the pressure compartments 22, 23 occurs is within the vicinity of a transmission ratio of approximately 1:1. However, it is possible to change the location of the switch-over point or the switch-over range within the overall range of the cone-pulley transmission through an appropriate arrangement and configuration of the channels 59, 60 and of the portions 63, 64 of the conical disk 1a that interact with the channels 59, 60.

The connection or separation between the two pressure compartments 22, 23 can also be accomplished by providing for this purpose a special valve that may be arranged in combination with a channel connecting the two pressure compartments 22, 23 where, in addition, this valve need not be controllable directly via the disk 1a or 2a but may be energized, e.g., from an external energy source. An electromagnetically, hydraulically, or pneumatically energized valve that can be switched dependent on the ratio or change in the ratio of the transmission may be used for this purpose. As an example, a so-called 3/2 valve effecting a connection or separation between the two pressure compartments 22, 23 could be employed. However, it is also possible to use pressure valves. A suitable valve of this kind could be arranged in combination with a conduit connecting the two channels 35 and 58, with the two channels 59 and 60 being closed off or omitted in this case. The valve in this arrangement is oriented and connected in such a manner that in the case where the pressure compartments 22, 23 are separated, the valve provides pressure relief to the pressure compartment 23. For this purpose, the valve may be connected to a conduit leading back to the oil sump.

When an externally controllable valve is employed, it becomes possible to also energize the valve dependent on other parameters. Thus, the valve could also be made to operate dependent on abrupt changes in the driving torque. Thereby, slippage of the chain belt can be avoided or in any case reduced, at least under certain operating conditions or in certain portions of the transmission range of the cone-pulley transmission.

In the design configuration shown in FIGS. 7 and 8, the torque sensor 14 is arranged on the driving side and adjacent to the axially displaceable conical disk 1a. However, the torque sensor 14 may be arranged at and adapted to any arbitrary point in the flow path of the torque. Thus, as is essentially known, a torque sensor 14 can also be arranged on the driven side, i.e., on the driven shaft B. A torque sensor of that kind may then be placed adjacent to the axially movable conical disk 2a in a similar manner as the torque sensor 14. As is further known, it is also possible to use a plurality of torque sensors. Thus, for example, a suitable torque sensor may be arranged both on the driving side and on the driven side.

Also, the torque sensor 14 may be combined with at least two pressure compartments 22, 23, using other essentially known measures to modulate the pressure dependent on the torque and/or dependent on the transmission ratio. Thus, for example, the roller elements 20 could be displaceable, dependent on a change in the transmission ratio, in the radial direction along the roller ramps or roller paths that interact with the roller elements, similar to the arrangement described in the publication DE-OS 42 34 294.

In the embodiment according to FIG. 7, the pressure chamber 6 is connected to the torque sensor 14. However, the pressure delivered by the torque sensor 14 may also be supplied to the exterior pressure chamber 13, in which case the interior pressure chamber 6 serves the purpose of changing the transmission ratio. To accomplish this, one only has to mutually interchange the connections of the two conduits 52 and 37 to the second disk set 2.

In the embodiment of the torque sensor 14 according to FIG. 7, the components of the torque sensor are made largely of sheet metal. Thus, particularly the ramp disks 18 and 19 can be made as sheet metal stampings, e.g., by press-forming.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An infinitely variable cone-pulley transmission with means for switching a pressure compartment on and off dependent on the transmission ratio, comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and the shaft includes an oblique bore hole that runs through the shaft at an oblique angle from a location on the circumference of the shaft connected with the second pressure compartment and a tap hole leading into the oblique bore hole, said oblique bore hole being connected to the space outside of the shaft and the tap hole being closed off when the distance between the conical disks is large, and said oblique bore hole being blocked and the tap hole being connected to the pressure chamber when the distance between the conical disks is small.

2. The transmission of claim 1, wherein the tap hole runs in the radial direction.

3. An infinitely variable cone-pulley transmission with means for switching a pressure compartment on and off dependent on the transmission ratio, comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and the shaft includes two oblique bore holes that run at least nearly all the way through the shaft and are connected with each other, at least one of said bore holes having openings at both ends to the circumference of the shaft, said oblique bore holes connecting the second pressure compartment to the space outside of the shaft and a further opening of the oblique bore holes falling in between the inner and outer centering guide portions of the movable conical disk when the distance between the conical disks is large, and said movable conical disk closing off the bore holes to the space outside of the shaft and opening up the further opening of the oblique bore holes to effect a connection to the pressure chamber when the distance between the conical disks is small.

4. An infinitely variable cone-pulley transmission with means for switching a pressure compartment on and off dependent on the transmission ratio, comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and the shaft includes two oblique bore holes running into each other inside the shaft, one of said oblique bore holes starting from a location on the circumference of the shaft connected with the second pressure compartment, the other oblique bore hole having an end that opens to the circumference of the shaft, the end of said other oblique bore hole being connected to the space outside of the shaft when the distance between the conical disks is large via an axial channel between the movable conical disk and the shaft and an axial groove in the shaft, and the end of said other oblique bore hole being connected to the pressure chamber and the axial groove being closed off to the space outside of the shaft by the movable conical disk when the distance between the conical disks is small.

5. The transmission according to claim 4, wherein the axial groove is formed in the area of the attachment that prevents rotational but permits axial relative movement between the movable conical disk and the shaft.

6. An infinitely variable cone-pulley transmission with means for switching a pressure compartment on and off dependent on the transmission ratio, comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and from an opening of the channel openings that connects the second pressure compartment to the space outside of the shaft when the distance between the conical disks is large, an axial groove extends to the movable conical disk and an axial channel is formed between the movable disk and the shaft at an axial distance from the axial groove, the opening of the channel openings being closed off by the movable conical disk and the axial groove being connected to the pressure chamber via the axial channel and a further axial groove on the surface of the shaft when the distance between the conical disks is small.

7. The transmission according to claim 6, wherein the axial groove is formed in the area of the attachment that prevents rotational but permits axial relative movement between the movable conical disk and the shaft.

8. An infinitely variable cone-pulley transmission with means for switching a pressure compartment on and off dependent on the transmission ratio, comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and a channel of the channels formed in the shaft connecting the second pressure compartment to the space outside of the shaft when the distance between the conical disks is large ends in two bore holes that are axially offset from each other and have openings to the outside, further comprising a connector bore hole leading from the pressure chamber to the shaft though the movable conical disk, the inner of the two axially offset bore holes being closed off by the inner centering guide portion of the conical disk and the outer of the two axially offset bore holes being connected to the connector bore hole when the distance between the conical disks is small.

9. Means for switching a pressure compartment on and off dependent on the transmission ratio in an infinitely variable cone-pulley transmission comprising a shaft having a pair of conical disks including a movable conical disk attached in a manner that prevents rotational but permits axial relative movement and a fixed conical disk solidly attached, a pressure chamber formed between the movable conical disk and a ring-shaped component that is solidly attached to the shaft, a first pressure compartment formed between the side of the ring-shaped component that faces away from the pressure chamber and a ring-shaped, piston-like part that is axially movable relative to the shaft and is acted upon by a force whose magnitude depends on the magnitude of the torque acting on the shaft, and a second pressure compartment formed, likewise, between the ring-shaped component and the piston-like part, wherein the first pressure compartment is connected to a pump and has an outlet channel that is closed off by the piston-like part to an increasing degree when there is an increase in the torque, the movable conical disk has inner and outer centering guide portions sliding in tight contact along the surface of the shaft and interacting with channel openings in the circumference of the shaft to form a valve arrangement which, through channels formed in the shaft, connects the second pressure compartment to a space outside of the shaft when a distance between the conical disks is large and which connects the second pressure compartment with the pressure chamber when the distance between the conical disks is small, and the shaft includes an oblique bore hole that runs through the shaft at an oblique angle from a location on the circumference of the shaft connected with the second pressure compartment and a tap hole leading into the oblique bore hole, said oblique bore hole being connected to the space outside of the shaft and the tap hole being closed off when the distance between the conical disks is large, and said oblique bore hole being blocked and the tap hole being connected to the pressure chamber when the distance between the conical disks is small.

* * * * *